United States Patent
Hulsman

[15] 3,701,137
[45] Oct. 24, 1972

[54] TRANSISTORIZED THERMOCOUPLE FLAME DETECTOR

[72] Inventor: William H. Hulsman, Needham, Mass.

[73] Assignee: Control Design, Inc., Needham, Mass.

[22] Filed: Sept. 29, 1970

[21] Appl. No.: 76,386

[52] U.S. Cl...............340/228 R, 317/133.5, 328/6, 340/417, 431/80
[51] Int. Cl......F23m 5/10, G08b 17/06, H01h 47/26
[58] Field of Search...340/227 R, 228 R, 213 R, 417; 73/359; 431/80; 317/133.5; 328/6; 136/207, 217; 307/117, 116, 280, 300, 313

[56] References Cited

UNITED STATES PATENTS

| | | |
|---|---|---|
| 3,076,100 | 1/1963 | Cowlin.................317/133.5 X |
| 3,283,579 | 11/1966 | Josephs.................340/228 X |
| 3,100,397 | 8/1963 | Peltola.........................73/359 |
| 2,793,291 | 5/1957 | O'Connell et al...317/133.5 X |
| 3,453,450 | 7/1969 | Evalds.................340/228 UX |
| 2,892,165 | 6/1959 | Lindsay.................307/313 X |

Primary Examiner—John W. Caldwell
Assistant Examiner—Scott F. Partridge
Attorney—Russell & Nields

[57] ABSTRACT

A system for detecting the presence of a burner flame in which the flame heats a thermocouple which is connected to the emitter of a transistor. The transistor is connected to conduct heavily when the thermocouple is cold and to conduct less heavily when the thermocouple is hot. A circuit which generates periodic pulses of voltage is connected to the transistor to cause it to conduct heavily upon the occurrence of each pulse, thus causing a substantial change in the conduction of the transistor only when the thermocouple is hot. This change in conduction generates a control voltage which is used to activate a control relay to control the flow of fuel to the burner.

2 Claims, 2 Drawing Figures

PATENTED OCT 24 1972　　　　　　　　　　　　　3,701,137

INVENTOR
WILLIAM H. HULSMAN
BY Russell and Nields
ATTORNEYS

TRANSISTORIZED THERMOCOUPLE FLAME DETECTOR

BACKGROUND OF THE INVENTION

1. Field of the Invention

Thermocouple Flame Detectors

2. Description of the Prior Art

In systems for detecting the presence or absence of a flame it is highly desirably to utilize a thermocouple as the flame detecting device. However, prior art devices which have utilized thermocouples for such purpose have suffered the drawback of imposing such a demand on the thermocouple that if the direct current resistance of the circuit into which the thermocouple is fed exceeds a very low value, the device fails to operate reliably. This is due to the fact that the thermocouple itself has a virtually zero direct current resistance and the voltage which it generates when hot is also low. In circuits which operate by the flow of current from the thermocouple, relatively small increases in resistance above the low level required for proper operation may reduce the current flow to an inoperative or unreliable level. To keep the resistance of such a circuit low, extreme care must be taken in making each electrical joint to insure that no deterioration of any such joint shall occur during the lifetime of the system. This requirement has increased the cost of fabricating and of maintaining such systems. Other satisfactory approaches for solving this problem in a simple, inexpensive and foolproof manner have not been achieved.

SUMMARY OF THE INVENTION

In the present invention the limitations of the prior art have been overcome by providing a transistor having a voltage controllable electrode and by connecting the output of the thermocouple to said electrode, the circuit including said electrode presenting a resistance which is extremely high with respect to the resistance of the thermocouple. The transistor is supplied with voltages which cause it to conduct heavily when the thermocouple is cold and less heavily when the thermocouple is hot. In addition, periodic voltage pulses are impressed on the transistor to cause it to conduct heavily, whether or not it was doing so prior to the occurrence of said pulses, thus producing substantial changes in conduction of the transistor only when the thermocouple is hot. Such changes are used to indicate the presence of a flame.

DETAILED DESCRIPTION OF THE INVENTION

Figure 1:
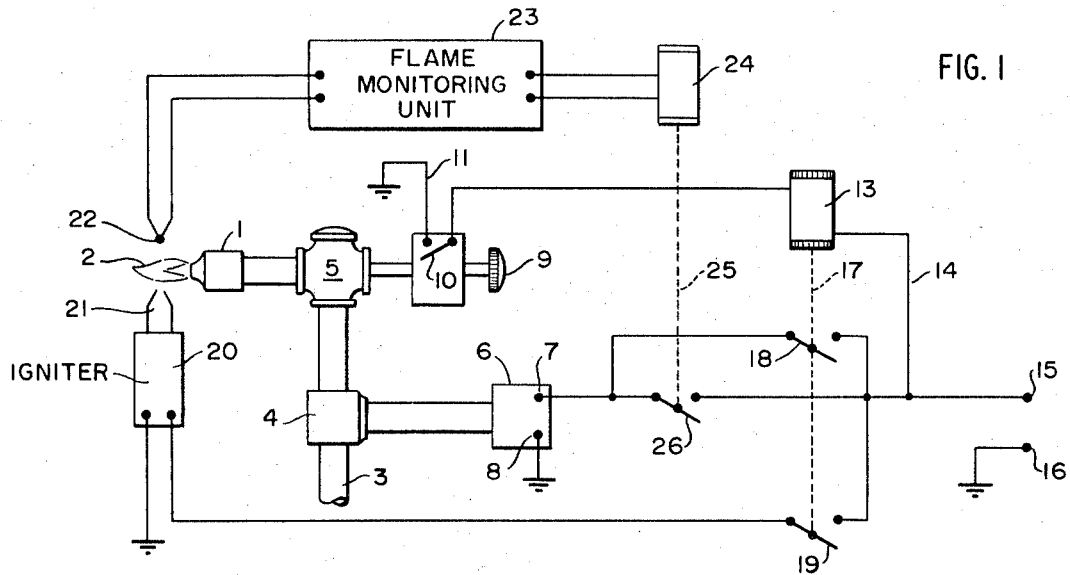
FIG. 1 is a simplified diagram of a single burner monitoring system incorporating this invention.

In the embodiment of the invention shown in FIG. 1, a burner 1, adapted to support a flame 2, is supplied with fuel, such as a combustible gas, from a supply line 3 through a solenoid valve 4 and a manual valve 5. The solenoid valve 4 is actuated by a solenoid 6 which, when supplied with energizing current at its terminals 7 and 8, opens the valve 4 and which, when the energizing current stops, closes the valve 4. The manual valve 5 is opened and closed by any suitable manually operable control element such as a knob 9. When the knob 9 is operated to open valve 5, it actuates a switch 10, one terminal of which is connected by a lead 11 to ground, while the other terminal of which is connected by lead 12 to one terminal of the energizing element of a relay 13, the other terminal of which is connected by lead 14 to one terminal 15 of a source of electrical current, the other terminal 16 of which is connected to ground. Switch 10 is of a well-known type which, when knob 9 is turned to open valve 5, closes for a short time of sufficient duration to cause relay 13 to become energized, after which switch 10 opens. Relay 13 is provided with an operator 17 connected to switch arms 18 and 19. Switch arm 18 closes a circuit from terminal 15 to terminal 7 of solenoid 6, terminal 8 being connected to ground. Thus solenoid 6 is operated to open valve 4. Thereupon, gas is free to flow through valves 4 and 5 to burner 1. At the same time, switch arm 19 closes a circuit from terminal 15 through an igniter 20 to ground, thus energizing said igniter. Igniter 20 is of any well-known type which supplies igniting energy at its output terminals 21 to ignite the gas flowing from the burner 1 to start the flame 2. Relay 13 is a well-known type which, after it has been energized by the pulse of operating current due to the closure of switch 10, maintains its operator 17 in its closed position for a predetermined period of time and then releases said operator to its open position.

Located in a position to be heated by the flame 2 is a thermocouple 22, the output of which is fed to a flame monitoring unit 23, the details of which will be described below. As long as thermocouple 22 is heated by flame 2, unit 23 supplies energizing current to a solenoid 24 which in turn causes its operator 25 to move switch arm 26 to complete a path across the switch arm 18 and its cooperating contact. The time delay in the opening of relay 13 is of sufficient length so that by the time switch arm 18 leaves its contact, flame 2 will have started and will have heated thermocouple 22 to cause solenoid 24 to be energized, thus maintaining the circuit to solenoid 6 through the closure of switch arm 26 on its contact. Thereafter, should flame 2 be extinguished, thermocouple 22 will cool resulting in a de-energization of solenoid 24 which will open switch arm 26 to de-energized solenoid 6, thus causing valve 4 to close and shut off the supply of gas to the burner.

Figure 2:
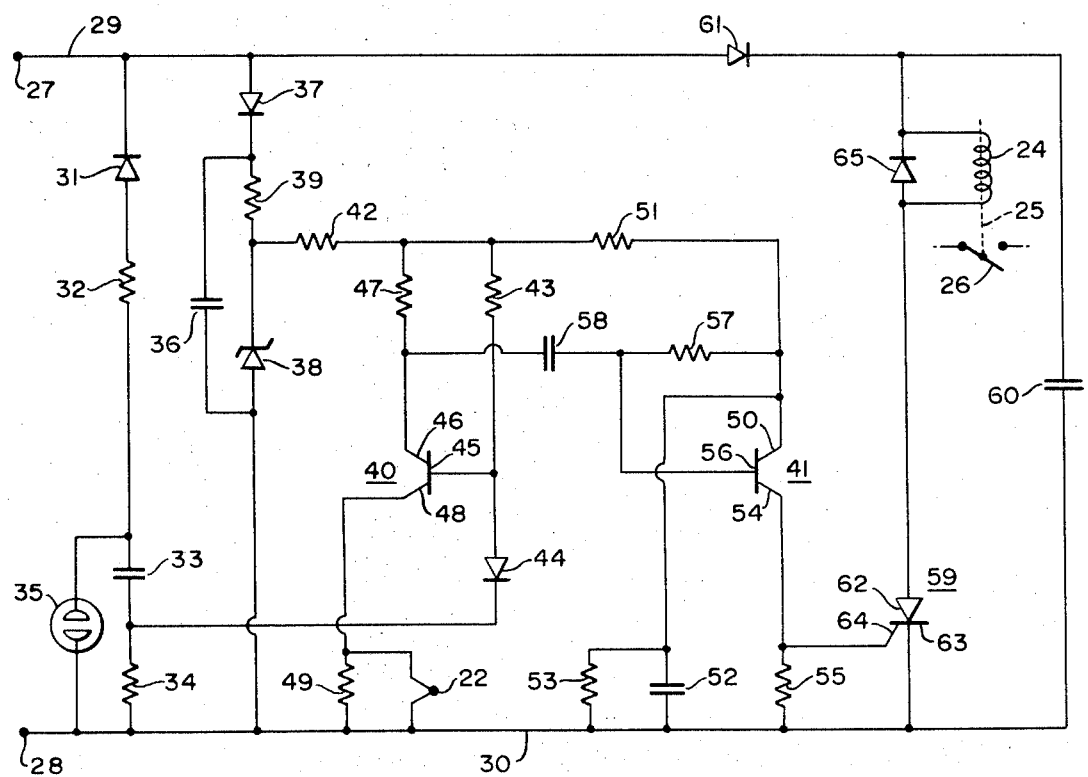
FIG. 2 is a detailed circuit diagram of the flame monitoring unit of FIG. 1.

In FIG. 2, which shows the details of the monitoring unit 23, power is supplied to the unit from a pair of terminals adapted to be connected to an alternating current source. Terminal 27 is connected to power lead 29 and terminal 28 is connected to ground lead 30. A diode 31 in series with a relatively high resistance 32 (e.g. 56 KΩ), a condenser 33 (e.g., 0.01 $\mu$f) and a relatively low resistance 34 are connected between leads 29 and 30. A glow tube 35 which breaks down and conducts current at a predetermined voltage (e.g., 65 volts) is connected across condenser 33 and resistance 34. During the negative half cycle, during which lead 29 is negative with respect to lead 30, condenser 33 charges through diode 31 and resistances 32 and 34. This charging continues until the voltage across glow tube 35 rises to the breakdown value of glow tube 35, whereupon the glow tube 35 fires and rapidly discharges condenser 33 to a value of voltage at which glow tube tends to extinguish (e.g., about 50 volts). However sufficient current continues to flow through diode 31 and resistance 32 to maintain conduction through the glow tube 35 at a constant level of voltage (e.g., 50 volts) until the voltage between leads 29 and 30 drop to a level which is insufficient to sustain such conduction. The discharge path of condenser 33, when glow tube 33 fires, is through resistance 34 and glow tube 35. The discharge current flow through resistance 34 produces a positive going voltage pulse at the junction of condenser 33 and resistance 34.

Also connected between leads 29 and 30 is a condenser 36 in series with a diode 37. A zener diode 38 in series with a resistance 39 (e.g., 27 KΩ) are connected across condenser 36. Condenser 36 charges rapidly through diode 37 and maintains a current flow through resistance 39 and zener diode 38 to cause the zener diode to maintain its regulated voltage (e.g., 12 volts) at all times.

The regulated voltage across zener diode 38 is used as a voltage supply to two transistors 40 and 41. The voltage for supplying the base 45 of transistor 40 is created in a circuit which extends from the junction between zener diode 38 and resistance 39, through resistance 42 (e.g., 750 KΩ), resistance 43 (e.g., 100 KΩ), diode 44 and resistance 34 to ground lead 30. The base 45 is connected to the junction between resistance 43 and diode 44. The collector 46 of transistor 40 is connected through a relatively high load resistance 47 (e.g., 1 megohm) to the junction between resistances 42 and 43. The emitter 48 of transistor 40 is connected in series with thermocouple 22 to ground lead 30. Preferably a relatively low resistance 49 (e.g., 22 Ω) is connected directly across thermocouple 22.

The current flowing through the circuit 42, 43, 44 and 34 creates a voltage drop across diode 44 and resistance 34 which is sufficient to cause base 45 to conduct heavily enough to bring collector 46 essentially to ground level with thermocouple 22 cold. The load resistance 47 is sufficiently high so that very little base current is required to produce this result.

When thermocouple 22 is heated, its generated electromotive force causes the emitter 48 to rise a few millivolts. This lowers the current of base 45 and causes the transistor 40 to move toward cut-off. As a result the collector 46 rises several volts depending on the gain of transistor 40 and the magnitude of the electromotive force generated by the thermocouple 22. This arrangement requires virtually no current drain from thermocouple 22 through emitter 48 so that the magnitude of the resistance of the connection between thermocouple 22 and emitter 48 has substantially no effect on the operation. Thus, the resistance of the transistor circuit into which the thermocouple feeds has an extremely high value as compared with the resistance of the thermocouple 22. For all practical purposes it may be considered as infinite. Thus the operation depends solely on the voltage generated by the thermocouple and not on the value of the current drawn from it.

When the pulse occurs at the junction between resistance 32 and condenser 33, the voltage, and thus the current, increases in the base 45 causing it to conduct heavily whether it had been conducting heavily or was partially cut off. As pointed out above, when thermocouple 22 is cold, transistor 40 is conducting heavily, and so when the above pulse occurs, transistor 40 continues to conduct heavily, and thus there will be little if any change on the collector 46. If, however, the thermocouple is heated and the voltage on the collector has risen as described above, when the above pulse occurs and the transistor passes from a partially cut-off state to a heavily conducting state, the collector voltage will drop momentarily to substantially ground level. Therefore the appearance of output voltage pulses at collector 46 will be indicative of the presence of a flame heating thermocouple 22.

The above output voltage pulses may be used for any desired purpose. In the embodiment shown, these output voltage pulses are amplified through transistor 41 and used to control solenoid 24. In this embodiment, the voltage at the junction between resistance 39 and zener diode 38 is impressed in emitter 50 of transistor 41 through the resistance 42 and resistance 51. (e.g. 100 KΩ). The emitter 50 is also connected through condenser 52 (e.g. 10 μf) to the ground lead 30. A resistance 53 (e.g., 100 KΩ) is connected across condenser 52. The output for transistor 41 is connected from its collector 54 through a load resistor 55 (e.g., 560 Ω) to the ground lead 30. The base 56 of transistor 41 is connected to the junction between resistance 51 and emitter 50 through a resistance 57 (e.g., 22 KΩ). The output voltage pulses on the collector 46 of transistor 40 are connected to base 56 through a condenser 58 (e.g., 0.01 μf).

The above circuit for transistor 41 is substantially a class B amplifier circuit in which transistor 41 is cut off during the quiescent stage in which no voltage pulse is impressed on base 56 through condenser 58. In this quiescent state condenser 52 is allowed to acquire a charge of a few volts between voltage pulses. Whenever a pulse is impressed on base 56, transistor 41 conducts and condenser 52 discharges through resistance 55 to generate an output control pulse which is used to fire a silicon control rectifier 59.

Solenoid 24 is energized by discharge of a condenser 60 (e.g., 1 μf) which is charged to the peak of the line voltage during each positive excursion of terminal 27 by being connected in series with a diode 61 between leads 29 and 30. The solenoid 24 is also connected in series with silicon control rectifier 59 between leads 29 and 30. Silicon control rectifier 59 includes an anode 62, a cathode 63 and a control electrode 64. Voltage pulses across resistance 55 are connected directly to control electrode 64 to fire silicon control rectifier 59. A diode 65 is connected across solenoid 24 to keep current flowing through said solenoid between discharge pulses caused by firings of control rectifier 59.

In the above arrangement, as long as thermocouple 22 is heated, solenoid 24 is energized to close switch arm 26 and keep gas flowing through burner 1. When flame 2 is extinguished, thermocouple 22 cools, and energizing pulses are no longer supplied to solenoid 24 which is deenergized to open switch arm 26 and cut off the flow of gas to burner 1.

It would be possible to omit resistance 49 across the thermocouple 22, and the system would operate satisfactorily as long as the thermocouple remained intact. However, should the thermocouple burn out or otherwise break, the emitter 48 would be left floating and its path to the ground lead 30 would be opened. For safety and reliability, resistance 49 is utilized to protect the system against damage to the thermocouple.

By utilizing the principles of this invention it is possible to produce flame detector systems in which the reliability of operation is not dependent upon the production and maintenance of low resistance connections between the thermocouple and the control devices. Also the operation of systems constituted in accordance with this invention is simple, inexpensive, and the system also operates in a virtually fail safe manner.

What is claimed is:

1. In a flame monitoring system having a burner adapted to support a flame, a thermocouple adapted to be heated by said flame and a control system responsive to the voltage generated in said thermocouple, comprising:
   a. a transistor having a plurality of electrodes including a voltage controllable electrode, said thermocouple being connected directly to said voltage controllable electrode to impose its voltage on said voltage controllable electrode;
   b. first means for imposing a voltage on electrodes of said transistor of a magnitude to cause said transistor to conduct heavily in absence of voltage being generated in said thermocouple;
   c. the connection from said thermocouple to said voltage controllable electrode being poled to decrease the conduction of said transistor upon generation of a voltage in said thermocouple;
   d. second means for supplying periodic voltage pulses to electrodes of said transistor of a magnitude to cause said transistor to conduct heavily during each such impulse; and
   e. third means responsive to substantial changes in conduction of said transistor to indicate the presence of said flame.

2. A system as in claim 1 in which the electrodes of said transistors comprise a base, an emitter and a collector and in which a power terminal and a ground terminal adapted to be connected to a source of current are provided and in which:
   a. the thermocouple is connected between said emitter and said ground terminal;
   b. said first means comprises a circuit for deriving a first voltage from said terminals and impressing said voltage on said base and for deriving a second voltage from said terminals and for connecting said second voltage to said collector through a relatively high load resistance; and
   c. said second means is connected between said base and said ground terminal.

* * * * *